Dec. 29, 1970 W. BOCK-GREISSAU 3,550,310
BODY OF VARIABLE FORM COMPOSED OF A PLURALITY OF HINGEDLY CONNECTED ORTHOGONAL PRISMS NO LESS THAN SIX
Filed Dec. 26, 1967 3 Sheets-Sheet 1
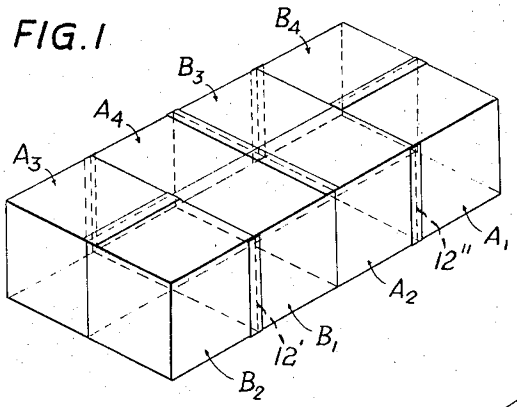
FIG. 2
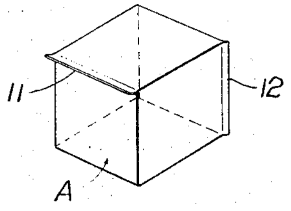
FIG. 3
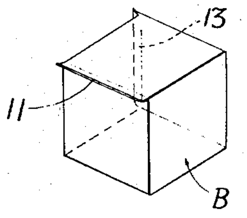
FIG. 4
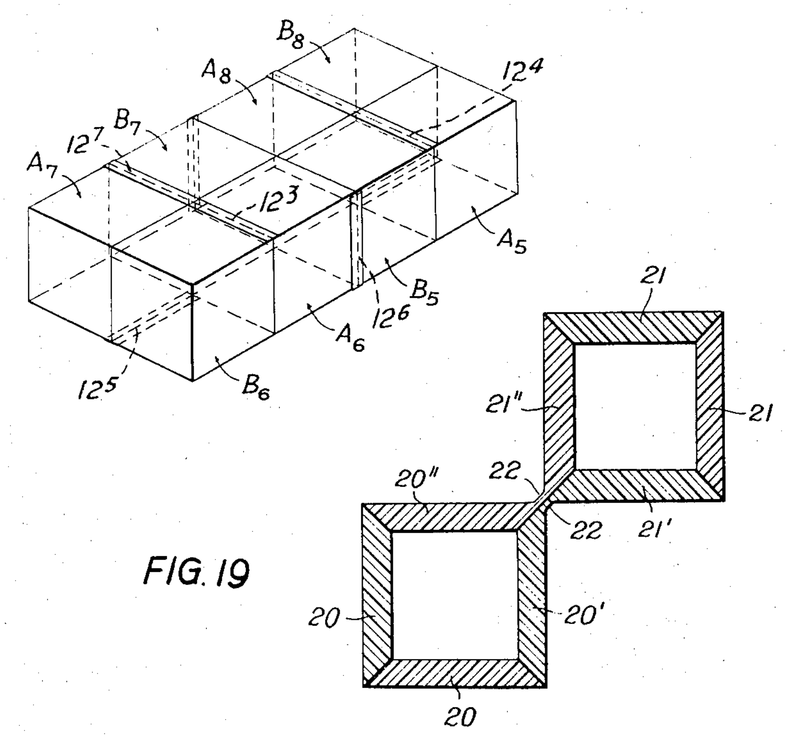
Inventor:
Wolfgang Böck-Greissau
By [signature]
attorney Inventor
Wolfgang Böck-Greissau
By Ernest G. Montague
attorney Inventor:
Wolfgang Bock-Greissau
By Ernest Montague
attorney United States Patent Office 3,550,310
Patented Dec. 29, 1970

3,550,310

BODY OF VARIABLE FORM COMPOSED OF A PLURALITY OF HINGEDLY CONNECTED ORTHOGONAL PRISMS NO LESS THAN SIX

Wolfgang Bock-Greissau, 2 Ditscheinergasse, 1030 Vienna, Austria
Filed Dec. 26, 1967, Ser. No. 693,425
Claims priority, application Austria, Jan. 2, 1967, A 7/67
Int. Cl. A63h *33/06*
U.S. Cl. 46—25 5 Claims

ABSTRACT OF THE DISCLOSURE

A body of variable form which comprises an even number not less than six rectangular prisms each having six rectangular faces, and hinges for connecting the prisms along edges thereof resting against one another. Each of the prisms is directly hinged to two adjacent prisms along two edges thereof, wherein the two hinged edges of each of at least half the number of the prisms cross at right angles at a distance from one another. Such bodies may assume a number of stable configurations and a plurality of such bodies may be combined into various stable block structures.

The present invention relates to a body of variable form composed of an even number of rectangular prisms i.e., prisms having six rectangular faces, preferably cubes, no less than six hinged to one another along edges, so that they can swing through 180° and which is intended and suitable primarily as a toy for children, but may also serve other purposes, for example, it may be used as publicity material or, when made of suitable size, as play furniture, scenery for the stage and other articles which can be varied in form.

In known bodies of this kind which serve as toys, the individual prisms hinged to one another are articulated throughout at parallel edges, as a result of which, it is true the form of the bodies can be varied in many ways, but the prisms must always remain between two like, parallel boundary or defining planes which are normal to the swivelling axes.

It is one object of the present invention to provide a body of the kind mentioned above, which, by means of one or more swinging movements, about the edges acting as hinges, can be brought from a basic form into a large number of different forms, which have the stability required for building games and other purposes, without other connecting means being employed. A toy building set consisting of a plurality of completely similar bodies according to the present invention enables a surprisingly large number of structures of different shapes to be made with a small number of manipulations.

It is another object of the present invention to provide a body of variable form composed of an even number of orthogonal prisms no less than six, wherein it is possible to produce from the bodies according to the present invention constructions or combinations which can be brought as an entirety from one form into a completely different form in a manner heretofore unknown, by simply pushing or pulling the body with one's fingers. This fact makes possible stage scenery with novel transformation effects.

With these and other objects in view which will become apparent in the following detailed description, the present invention will be clearly understood in connection with the accompanying drawings, in which:

FIG. 1 is a perspective diagrammatic view of a basic form of a body according to the present invention;

FIGS. 2 and 3 are perspective views of two different elements of which this body is composed;

FIG. 4 is a perspective diagrammatic view of a basic form of another body according to the present invention;

FIG. 19 is a cross-section through two cubes with a preferred type of hinged joint.

Figure 5:
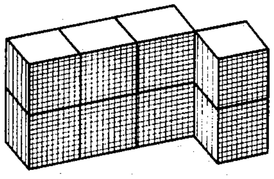
FIGS. 5 to 11 are perspective views of various forms into which the body according to FIG. 1 or FIG. 4 can be brought.
Figure 6:
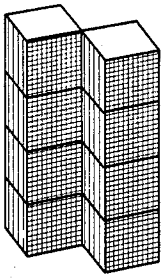
Figure 7:
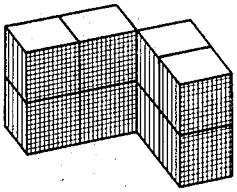
Figure 8:
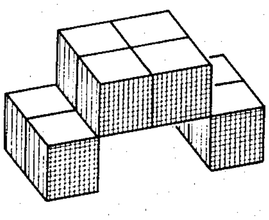
Figure 9:
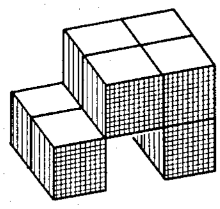
Figure 10:
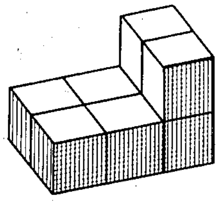
Figure 11:
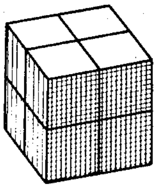

Referring now to the drawings, and in particular to FIG. 1, the body consists of eight cubes A1 to A4 and B1 to B4 hinged to adjacent cubes in each case at two edges to form an endless chain. The edges which are hinged to one another are illustrated in the drawings by a double line with a central dashed line therebetween. All the cubes A1 to A4 have the same permanent mutual arrangement of its two edges which are hinged to permanent adjacent edges and all the cubes B1 to B4 likewise have the same arrangement of its two permanent mutual hinged edges, but one which is different with respect to that of the cubes A, namely with mirror-image symmetry.

A cube A and a cube B are each shown by themselves in FIGS. 2 and 3, respectively, the edges thereof which form the hinged edges being represented by double lines. It will be seen, that the hinged edge 11 of the cube A crosses spaced apart relative to the other hinged edge 12 of the same cube; and likewise the similar hinged edge 11 of the cube B crosses spaced apart relative to the other hinged edge 13 of the cube B, namely these edges extend at an angle of 90° relative to one another and one hinged edge is spaced at a distance from the other hinged edge, which corresponds to the length of a side of the cube. There are only the two possibilities shown of satisfying this condition in a cube, namely cube A (FIG. 2), and cube B (FIG. 3).

All the cubes A1 to A4 and B1 to B4 shown in FIG. 1 have their hinged edges arranged as shown in FIG. 2 and FIG. 3, respectively. It is to be noted, that the eight cubes in FIG. 1 join up with one another in the sequence A–A–B–B–A–A–B–B and that, in each of the eight pairings of cubes that can be singled out, in the position of FIG. 1, namely A1–A2, A2–B1, B1–B2, B2–A3, A3–A4, A4–B3, B3–B4, B4–A1, the two outer hinged edges (e.g., for pairing A2–B1, outer hinged edges 12′, 12″) each establishing connection with an adjacent cube lie in the same plane.

Referring now to the drawings, and in particular to FIG. 4, eight cubes A5 to A8 and B5 to B8 with hinged edges which are arranged as shown in FIGS. 2 and 3 are likewise hingedly connected together to form an endless chain, but the arrangement of the cubes is characterized by the sequence A–B–A–B–A–B–A–B and in each of the eight pairings of cubes, namely, A5–B5, B5–A6, A6–B6, B6–A7, A7–B7, B7–A8, A8–B8, B8–A5, that can be singled out, in the position of FIG. 4, the two outer hinged edges each establishing connection with an adjacent cube lie in the same plane only in every second of these pairings (e.g., pairing A6–B5 has outer hinged edges 12[3], 12[4] in the same plane, whereas next pairing B6–A6 has outer hinged edges 12[5], 12[6] not in a single plane, but the next pairing B6–A7 has outer hinged edges 12[3], 12[7] again in a single plane).

Figure 12:
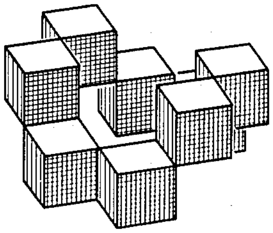
FIGS. 12 to 14 are perspective views of various forms into which only the body according to FIG. 1 can be brought.
Figure 13:
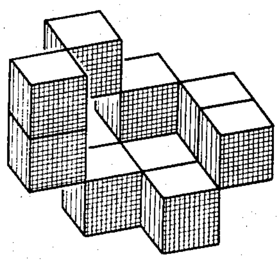
Figure 14:
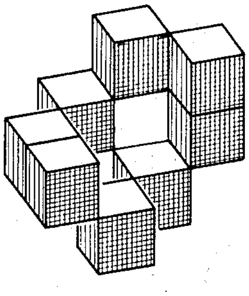

By simply hingeing the cubes about one or more swivelling axes, which are formed in some cases by two coaxially hinged edges, the three-dimensional structures according to FIGS. 5 to 11 can be produced from the two basic forms according to FIGS. 1 and 4. The constructional form according to FIG. 1 moreover permits a transformation to a ring-like shape (i.e., with an opening surrounded by the endless chain of cubes), so that the structures according to FIGS. 12 to 14 can be produced therefrom.

Figures 15, 16, 17, 18:
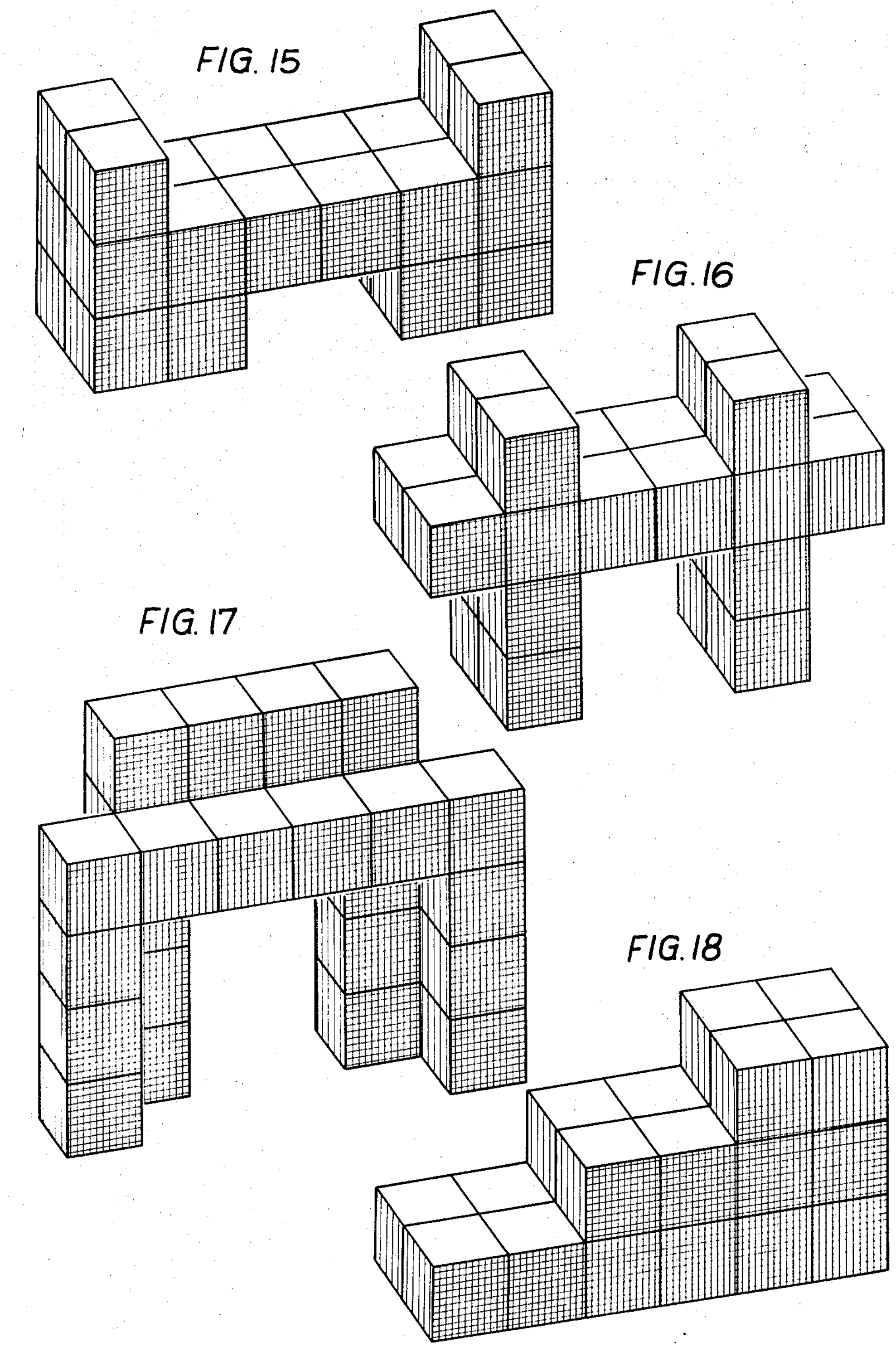
FIGS. 15 to 18 are perspective, diagrammatic views of structural forms consisting of three of such bodies.

Referring still further to the drawings, and in particular to FIGS. 15 to 18, forms of structures are disclosed which can be made in each case from three bodies according to FIG. 1 or 4 by arranging them together in various ways. As can be seen, these forms of structures have the basic shape of a bed (FIG. 15), a bridge (FIG. 16), a gate (FIG. 17), and a staircase (FIG. 18). It is clear that a large number of other forms of structures which correspond to objects in everyday life and, moreover, to abstract structural forms can also be produced by combining two or more bodies according to the invention, which meet the aim that is to be achieved of stimulating the creative urge of a child at play.

If, between individual pairs of cubes with hinged edges in the arrangement according to FIG. 1 or FIG. 4, there are inserted cubes which are connected to the two adjacent cubes at parallel hinged edges, more bodies are obtained which can also be changed into many other forms.

Instead of cubes, all sorts of prisms, having six rectangular faces may also be used to form the bodies, a larger number of variants of the bodies and forms of structure which can be produced being obtained therewith due to the different edge lengths.

It can be seen from FIG. 19 how two individual cubic elements can be hinged to one another in the simplest manner. The two cubes each consist of six frusto-pyramidal wall parts 20 and 21, respectively, of synthetic material which are joined together in a suitable manner, for example, by cementing at the inclined lateral surfaces. A synthetic material which is flexible in film thickness is employed for this purpose. For hinged connection of the two cubes, two pairs of meeting wall parts thereof, 20', 21' and 20'', 21'', are each connected by a short filmlike portion 22.

The pairs of wall parts 20', 21' and 20'', 21'', respectively each form with their flexible connecting portions 22 a single piece produced in one operation by pressing or molding. If each of the cubes is produced from wall elements, two of which are hingedly connected in the manner described to wall elements of an adjacent cube, the two basic bodies illustrated in FIGS. 1 and 2 can be produced therewith in a simple manner.

While I have disclosed several embodiments of the present invention, it is to be understood that these embodiments are given by example only and not in a limiting sense, the scope of the present invention being determined by the objects and the claims.

I claim:

1. A body of variable form comprising an even number of no less than six rectangular prisms, each having six rectangular faces, a plurality of hinges for connecting said prisms along edges thereof resting against one another, each of said prisms in all positions being directly hinged by said hinges to two adjacent of said prisms along two permanently mutually connected edges of said each of said prisms and said two adjacent prisms, and said two permanently mutually connected edges of each of at least half of the number of said prisms cross at right angles spaced from one another, said body adapted to be combined with another said body for forming composite geometrical configurations.

2. A body of variable form, as set forth in claim 1, wherein the number of rectangular prisms is eight, said plurality of hinges constitute eight hinges, said eight prisms hingedly mounted on one another form a closed chain, said eight prisms including a first two pairs of prisms, each of said first two pairs comprising two of said prisms each with said two permanently mutually connected edges thereof crossing at right angles spaced from one another in a first relative mutual arrangement of said two permanently mutually connected edges with respect to each other, said eight prisms including a second two pair of prisms, each of said second two pairs comprising two of said prisms each with said two permanently mutually connected edges thereof crossing at right angles spaced from one another in a second relative mutual arrangement of said two permanently mutually connected edges with respect to each other, having a mirror-image symmetry with respect to said first relative mutual arrangement, and alternating pairs of prisms constituting one of said first two pairs of prisms and one of said second two pairs of prisms follow one another alternately in said closed chain.

3. A body of variable form, as set forth in claim 1, wherein the number of rectangular prisms is eight, said plurality of hinges constitute eight hinges, said eight prisms hingedly mounted on one another form a closed chain, one half of the number of said prisms each with said two permanently mutually connected edges thereof crossing at right angles spaced from one another having a first relative mutual arrangement of said two permanently mutually connected edges with respect to each other and the other half of the number of said prisms each with said two permanently mutually connected edges thereof crossing at right angles spaced from one another in a second relative mutual arrangement of said two permanently mutually connected edges with respect to each other and having mirror-image symmetry with respect to said first relative mutual arrangement, and said prisms of said one half and said prisms of said second half follow one another alternately in said closed chain, individually.

4. A body of variable form, as set forth in claim 1, wherein the number of said rectangular prisms is eight, said plurality of hinges constitutes eight hinges, said eight prisms each consists of wall elements of synthetic material, which is flexible in film thickness, and said hinge connecting two adjacent prisms hingedly to one another comprises at least one filmlike connecting portion which is disposed between two adjacent edges of two of said wall elements of said two adjacent prisms, and is in one piece with said two wall elements of said adjacent prisms.

5. A plurality of bodies of variable form each comprising an even number no less than six rectangular prisms, each having six rectangular faces, a plurality of hinges for connecting said prisms along edges thereof, said edges resting against one another, each of said prisms in all positions being directly hinged by said hinges to two adjacent of said prisms along two permanently mutually connected edges of said each of said prisms and said two adjacent prisms, and said two permanently mutually connected edges of each of at least half of the number of said prisms cross at right angles spaced from one another, each of said bodies adapted to be combined with each other for forming composite geometrical configurations.

References Cited

UNITED STATES PATENTS

| | | | |
|---|---|---|---|
| 137,075 | 3/1873 | Harrington | 35—72UX |
| 510,216 | 12/1893 | Waibel | 46—24 |
| 2,245,875 | 6/1941 | Rutherford | 46—16 |
| 2,992,829 | 7/1961 | Hopkins | 273—157 |
| 3,201,894 | 8/1965 | Resch | 46—1 |

F. BARRY SHAY, Primary Examiner

U.S. Cl. X.R.

46—1; 273—155